May 14, 1935.  C. A. TURNER  2,001,168
FLOW INDICATOR
Filed June 29, 1934  2 Sheets-Sheet 1
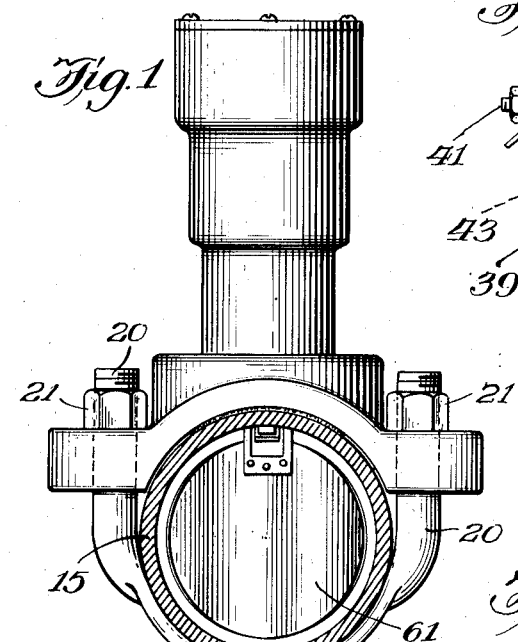
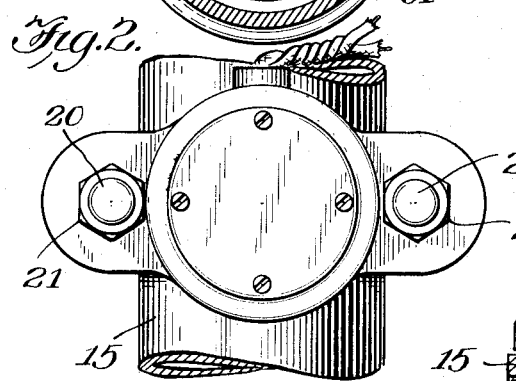
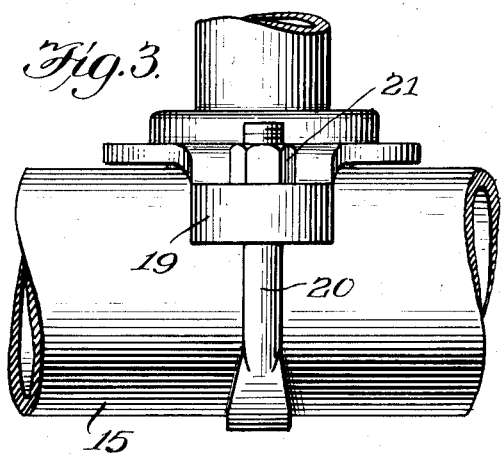
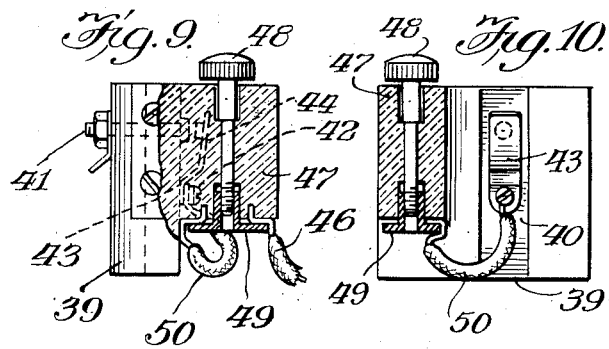
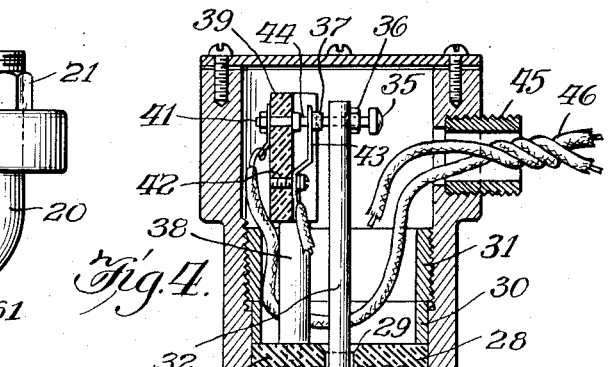
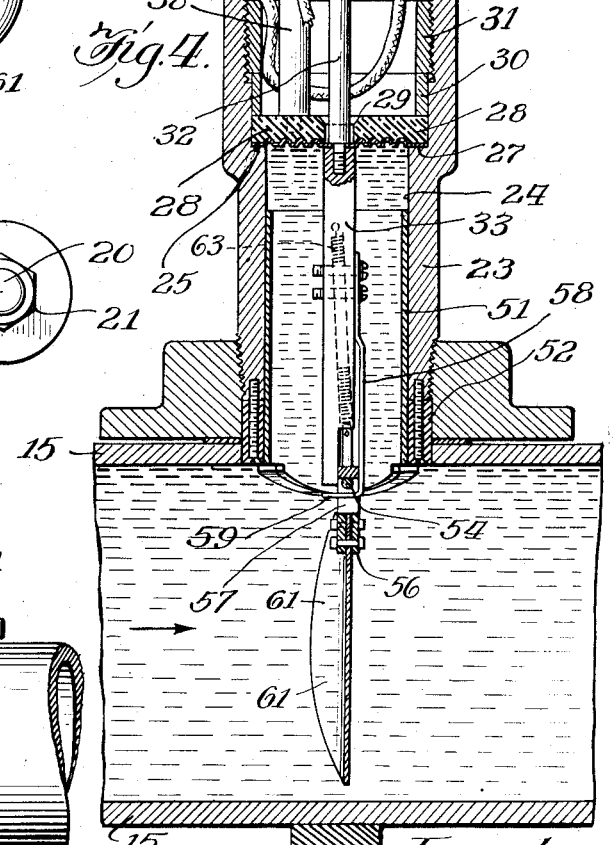
Inventor
Charles A. Turner May 14, 1935. C. A. TURNER 2,001,168
FLOW INDICATOR
Filed June 29, 1934 2 Sheets-Sheet 2
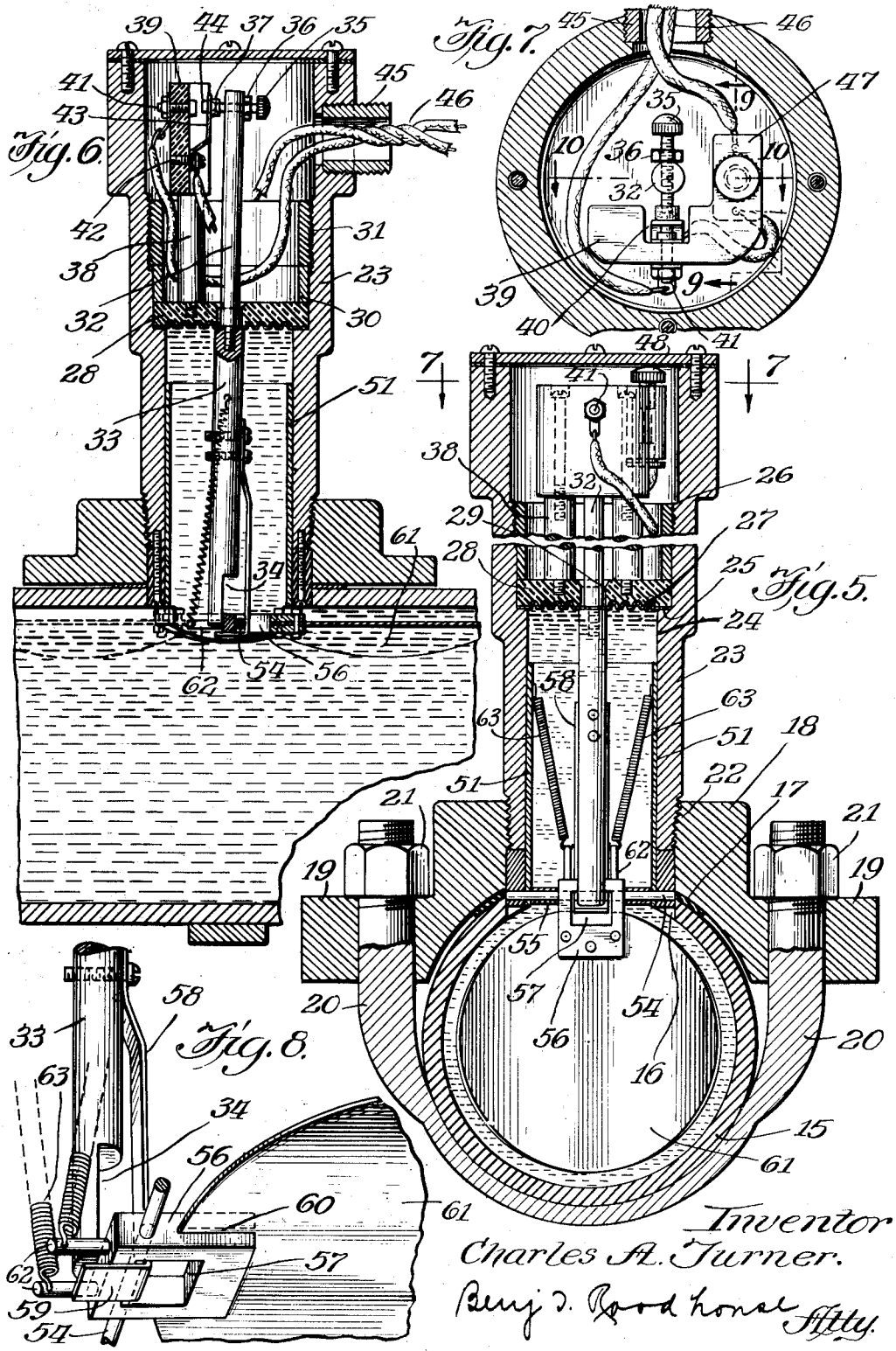

Patented May 14, 1935

2,001,168

UNITED STATES PATENT OFFICE 2,001,168

FLOW INDICATOR

Charles A. Turner, Chicago, Ill., assignor to Electric Controller Corporation, Chicago, Ill., a corporation of Illinois Application June 29, 1934, Serial No. 733,091

4 Claims. (Cl. 200—81)

My present invention relates to improvements in flow indicators, that is, the provision of a flow indicator suitable for employment in fluid circulating systems, such as fire sprinkler systems for indicating the flow of water therein. A prime requisite in such flow indicators is that it shall be so constructed that its operation will not be affected by considerable changes in pressure of the fluid contained in the system. Another important consideration is that such flow indicators should permit the drainage of the system without functioning to turn in an alarm, and should also permit the feeble water movements in such systems occasioned by the change of temperature of the water in a portion of the system and from other causes, other than an actual functioning of the system, to take place without the functioning of the flow indicator. Simplicity of design, sturdiness of construction, and dependability of operation are also prime requisites of such apparatus.

I have attained the foregoing objects by means of the structure illustrated in the accompanying drawings, in which—

Fig. 1 is a vertical elevation of a flow indicator assembled with a conduit of a circulating system, the conduit being shown in cross section.

Fig. 2 is a plan of the structure shown in Fig. 1.

Fig. 3 is a fragmental elevation of the structure shown in Figs. 1 and 2 at right angles to the position shown in Fig. 1.

Fig. 4 is a central sectional elevation of the flow indicator assembled with the conduit taken in a plane longitudinally with the pipe.

Fig. 5 is a vertical central sectional elevation similar to that shown in Fig. 4 but at right angles thereto.

Fig. 6 is a vertical sectional elevation similar to Fig. 4 but showing in full lines the blade in the position caused when a flow occurs and showing the blade in dotted lines in the position assumed when the system is being drained.

Fig. 7 is a top plan of the flow indicator, the top or closure being removed.

Fig. 8 is a perspective detail, to an enlarged scale, of the blade and the end of the rod with which it co-acts.

Fig. 9 is a sectional detail of one view of the switch mechanism on section 9—9 of Fig. 7.

Fig. 10 is a sectional detail of another view of the switch mechanism on section line 10—10 of Fig. 7.

Similar reference characters refer to similar parts throughout the respective views.

For the installation of my flow indicator a circular hole is cut in the conduit 15 at the location where it is desired to position the flow indicator. While I have shown such a hole 16 in the drawings invariably on the top of the conduit, it is, as a matter of fact, not necessary to so position the aperture as my indicator will operate equally satisfactorily underneath, or in any position upon the sides of the conduit. Around the aperture 16 on the outside of the conduit is placed a gasket 17 of any suitable material. There are a large number of materials which may be desired for gaskets to be obtained upon the market, such as rubber, lead, and divers compositions.

Fitting over the conduit upon the gasket 17 is a yoke 18 having lateral ears 19 extending beyond the planes of the sides of the conduit. The ears 19 are bored for the passage of the ends of a bow 20 and to clamp this construction upon the conduit the ends of the bow 20 are threaded and provided with nuts 21 which screw down upon the ears 19. The yoke 18 is centrally bored to provide a passage therein registering with the aperture 16 in the conduit. The upper end of the central bore in the yoke 18 is slightly tapered and tapped, as at 22, to receive the lower end of the flow indicator casing 23 oppositely tapered and threaded to screw into the yoke 18. The lower portion of the casing 23 is provided with a bore 24, which bore is enlarged about half the length of the casing to provide the shoulder 25, and this enlarged bore is again enlarged, at 26, adjacent the top of the casing to facilitate the installation of the parts therein.

Seated on the shoulder 25 is a thin metal disk 27 provided throughout a portion of its area with concentric corrugations. The disk 27 is made of a preferably non-corrosive metal with sufficient flexibility to permit of the movements hereinafter described.

Seated immediately above the disk 27 I provide what I term a pressure plate 28 of sufficient thickness and strength to withstand any pressure likely to occur in the fluid in the conduit 15, the under surface of which pressure plate is likewise concentrically corrugated to conform with the corrugations in the disk 27. The center of the pressure plate 28 is bored centrally, as at 29, for the passage of the rod hereafter to be described.

The metal disk 27 and pressure plate 28 are held in position by a suitable length of tubing 30 upon the top of which is screwed an exteriorly threaded annulus 31, the intermediate width of bore in the casing 23 being tapped to receive it.

The disk 27 is centrally bored to permit the passage of the threaded reduced end of the rod 32 which screws into the bored and tapped end of the rod 33. The unattached end of the rod 33 is cut away, at 34, as most clearly shown in Figs. 6 and 8.

It will be seen from the foregoing description that force applied transversely to the lower end of the rod 33 will cause the thin metal disk 27 to separate to a greater or less extent from the pressure plate 28 and thereby permit the swinging of the rod 32 from the vertical.

Passing transversely through the upper end of the rod 32 is a knurled headed screw 35 provided with a lock nut 36 to maintain it in adjusted position. The end of the screw 35, opposite its knurled head, is provided with a block of insulating material 37.

Secured upon one side of the pressure plate 28 are a pair of columns or pillars 38 and screwed down upon the top of the columns 38 is a block of insulating material 39 provided with a central vertical channel 40. Passing through the block adjacent the top of the channel 40 is a bolt 41, the head whereof located in the channel 40 constituted a contact point. Screwing into the block 39 at a suitable distance below the bolt 41 is a screw 42 which serves to hold in place a spring switch blade 43 provided with a contact point 44 located opposite and co-operating with the contact end of the bolt 41.

The spring switch blade 43 is normally in such a position as to hold the contact point 44 out of contact with the head of the bolt 41. The insulating block 37 cooperates with the spring switch blade 43 to force the switch blade to close the circuit when the rod 32 is in vertical position, and to open the circuit when the rod 32 is displaced from the vertical in the proper direction. The wall of the casing 23 is bored adjacent the top thereof and is provided with a suitable bushing 45, through which pass the electrical conductors 46, one of which is held in contact with the bolt 41 by the nut on the end thereof.

Secured and extending laterally from one end of the insulating block 39 is an insulating block 47 centrally and vertically through which passes the knurled headed screw 48 which engages a plate 49 on the lower end of the block 47. The lower face of the block 47 under the plate 49 is provided with a pair of recesses in one of which is inserted the other of the conductors 46 and in the other of which recess is inserted the end of a short length of conductor 50, the opposite end whereof is held in contact with the switch blade 43 by means of the head of the screw 42.

It will now be seen from the foregoing description that any hydrostatic pressure may occur below the disk 27 without greatly effecting its flexibility and without permitting any fluid to pass by the disk 27 and pressure plate 28 into the upper compartment of the flow indicator where the switch mechanism is located.

To move the rods 32 and 33 from the vertical as flow may occur in the conduit 15 I provide the following mechanism: Fitting into the lower smaller bore of the casing 23 with a push fit is a length of tubing 51, the lower end of which extends beyond the casing 23 so as to substantially register and conform with the opening provided in the conduit 15. Fitting about the lower extending end of the tubing 51 is an annulus 52 suitably secured to the end of the valve casing 23. Between the lowermost points of the annulus 52 and tubing 51 extends a pintle 54 and pivoted centrally of the pintle 54 by means of suitable spacers 55 is a block 56 having a square aperture 57 therein, which aperture extends from just above the path of the pintle 54 for a sufficient distance rearwardly to accommodate the turned end of a spring blade hereafter to be described.

The aperture 57 is positioned with respect to the top of the block so as to provide above the pintle 54 a sufficient portion of the block which, when the block is rotated on the pintle, will displace the rod 33 a suitable distance to secure the opening and closing of the circuit as heretofore described. The top of the block 56 co-operates with the cut-out portion 34 of the rod 33, as most clearly shown in Fig. 8.

Secured to the side of the rod 33 is a flat spring 58 which extends down past the side of the block 56 and has its end 59 turned at right angles through the aperture 57. This spring 58 serves to hold the rod 33 yieldingly in contact with the block 56 so as to keep the rod 33 in contact with the block as the block is swung about the pintle 54. The block 56 is provided from its lower edge upwardly with a slot or kerf 60 in which is inserted the upper end of a blade 61 which is, preferably, formed of a non-corrosive flexible metal and curved slightly in the direction from which the flow comes, as is most clearly seen in Figs. 4, 6 and 8.

The blade 61 is somewhat smaller in diameter than the diameter of the conduit 15 and this difference in diameters between the diameter of the blade and the conduit is important as it permits a slow movement of the fluid in the conduit to occur without displacing the blade. In fact, the proportioning of the diameter of the blade 61 to the diameter of the conduit in which it is installed and the adjustment of the screw 35 affords me facilities for adjusting the device to any desired degree of sensitivity. When a full flow is taking place in the pipe 15 it is probable that all of the water in the pipe, except such as is frictionally delayed by the walls of the pipe, is moving forward at substantially the same speed. However, in the practical employment of such devices a rule is adopted requiring the device to show within a certain number of seconds a flow of so many gallons per minute, which is considerably less than a full flow. Under such minimum requirements it is altogether possible that the water in a stratum along the bottom of the pipe is only moving at the speed required by the rate of flow while such movement diminishes, and maybe entirely stops, as the distance increases above the moving stratum. As before said, the relative size of the blade 61, together with the adjustment of the screw 35, permits me to adjust the device so as to operate at any desired rate of flow.

Extending upwardly from adjacent the sides of the block 56 are a pair of rods 62 to which are attached coil springs 63, the other ends of which coil springs are secured adjacent its top to the tube 51. The springs 63 are for the purpose of restoring the blade 61 to a position aligning with the axis of the casing 23 after a flow in the pipe 15 has ceased. The action of the springs 63, in co-operation with the action of the spring 58 also secures the restoration of the rods 32 and 33 to alignment with the axis of the casing 23.

Water has very little compressibility so that the forces applied to the fluid in the system, when flow does not occur, result in pressure changes without actual movement of the fluid.

As will be seen from the foregoing description, taken in connection with the drawings, pressure changes will not effect the functioning of my device, nor will actual movements of water in the system, usually occasioned by a change in temperature of the water in some part of the system, cause the device to function unless the movement attains a rate above the designated minimum rate of flow, which rate of flow is never attained by the feeble flows set up by temperature differentials.

Having described my invention what I claim is new and desire to secure by Letters Patent is:

1. A flow indicator comprising a casing divided into a pressure chamber and a switch chamber by a diaphragm of thin flexible material facing the pressure chamber and a pressure plate centrally apertured and disposed back of and conforming with said diaphragm, a rod of greater diameter than the aperture in the said pressure plate extending from said diaphragm through said pressure chamber, a rod of less diameter than the aperture in said pressure plate secured through said diaphragm to said first mentioned rod, a pintle disposed diametrically of said pressure chamber, a flow indicating blade carried by said pintle, means for holding said blade in yielding co-operative relation with said rod of larger diameter, means for restoring the blade after movement to a normal position and switch opening and closing devices co-actively related with said rod of lesser diameter.

2. In flow indicating devices a cylindrical casing, a partition therein consisting of a corrugated diaphragm of flexible material, a pressure plate having a central opening conforming with and mounted against said diaphragm, a column of greater diameter than the opening in said pressure plate extending from the face of said diaphragm, a column of less diameter than the opening in said pressure plate secured to said first mentioned column through said diaphragm extending through the central opening in said pressure plate, flow responsive means co-actively associated with said column of greater diameter and circuit opening and closing means co-actively related with said column of lesser diameter.

3. A flow indicator comprising a casing, a diaphragm of thin flexible material, disposed transversely of said casing, a pressure plate centrally apertured and disposed on one side of and conforming with said diaphragm, a rod of greater diameter than the aperture in the said pressure plate extending from said diaphragm, a rod of less diameter than the aperture in said pressure plate secured through the opening in said pressure plate and said diaphragm to said first mentioned rod, pressure responsive means yieldingly held in co-operative relation with said rod of greater diameter and circuit controlling means co-operatively associated with said rod of lesser diameter.

4. A flow indicator comprising a casing, a diaphragm of thin flexible material having a concentric corrugation disposed transversely of said casing, a pressure plate centrally apertured and disposed on one side of and conforming with said diaphragm, a rod of greater diameter than the aperture in the said pressure plate extending from said diaphragm, a rod of less diameter than the aperture in said pressure plate secured through the opening in said pressure plate and said diaphragm to said first mentioned rod, pressure responsive means yieldingly held in co-operative relation with said rod of greater diameter and circuit controlling means co-operatively associated with said rod of lesser diameter.

CHARLES A. TURNER.